United States Statutory Invention Registration [19]

[11] Reg. Number: H956

Reindel

[43] Published: Aug. 6, 1991

[54] WAVEGUIDE FED SPIRAL ANTENNA

[75] Inventor: John Reindel, San Diego, Calif.

[73] Assignee: The United States of America as represented by the Secreatry of the Navy, Washington, D.C.

[21] Appl. No.: 835,859

[22] Filed: Jan. 30, 1986

[51] Int. Cl.[5] ..... H01Q 1/36

[52] U.S. Cl. ..... 343/895

*Primary Examiner*—Linda J. Wallace

*Attorney, Agent, or Firm*—R. F. Beers; E. F. Johnston; Harvey Fendelman

[57] ABSTRACT

This invention is a mechanism for connecting a spiral antenna to a waveguide with very low transmission and reflection losses. The invention provides a smooth broadband transition from a spiral, balanced transmission line through a printed circuit fin-line transition and then to a waveguide $TE_{10}$ E-plane transition and extends the use of spiral antennas to millimeter wave frequencies.

5 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

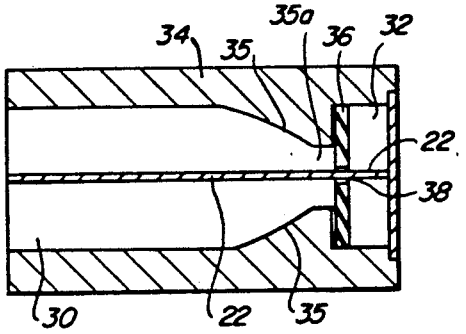
FIG. 2c
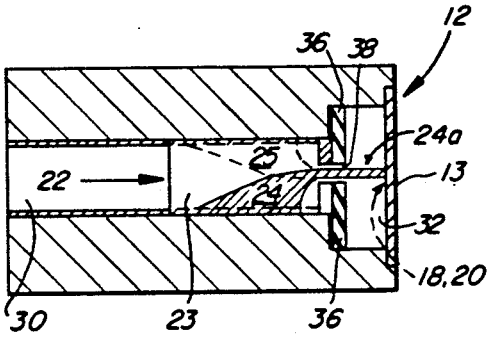
FIG. 2a
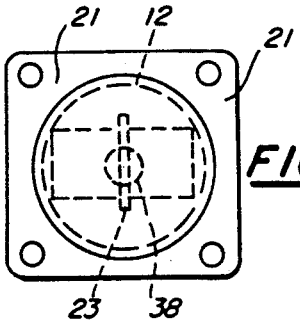
FIG. 2b
FIG. 3b
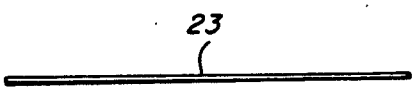
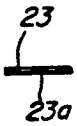
FIG. 3c
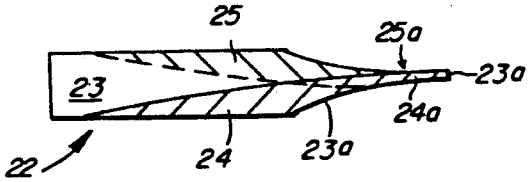
FIG. 3a

WAVEGUIDE FED SPIRAL ANTENNA

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to the field of transitions to and from waveguides and, more specifically, to the field of transitions from waveguide to balanced transmission lines and still more specifically, to spiral balanced transmission lines.

A printed circuit spiral antenna is a balanced transmission line wound into a spiral. Spiral antennas are very desirable for use in electronic warfare systems because such antennas have very broadband and broadbeam characteristics. The operable frequency range of a single antenna is as high as 2–18 GHz. The beamwidth of these antennas is about 90% and a set of four such antennas are commonly used for determining a signal's angles of arrival by means of amplitude comparison circuits. The balanced transmission lines that form such spiral antennas are normally matched to the commonly used coaxial transmission line by means of a balun. At higher frequencies, i.e. above 18 GHz, the size of the coaxial line must be very small to avoid moding and, hence, the balun becomes very difficult to assemble. The performance of spiral antennas at the millimeter wave frequencies is also degraded by the loss and VSWR of coaxial baluns. In general, coaxial lines are not desired for millimeter wave circuits. Thus, spiral antennas are better matched for waveguide circuits such as mixers and switches. It has been found that the optimum assembly of a millimeter wave circuit is achieved by integration of the various circuit components. Hence, it is desirable to provide a transition from the antenna that can be integrated with the normal millimeter wave circuits and hence utilize a balanced transmission line suitable for waveguide circuits.

SUMMARY OF THE INVENTION

The present invention is a printed circuit that adapts a spiral balanced transmission line to a fin-line transition and then from the fin-line medium to waveguide. The invention thus provides a smooth, low loss transition from a balanced transmission line wound into a spiral to a waveguide propagating in the $TE_{10}$ mode, which is likewise a balanced transmission line. This smooth, broadband transition from the spiral balanced transmission line to the waveguide balanced transmission line extends the use of spiral antennas to the millimeter wave frequencies where waveguide circuits are needed for processing signals received by the spiral antenna. Thus, the usage of spiral antennas can be extended to the millimeter wave bands in the frequencies ranging from 30–150 GHz by adapting the output of a balanced transmission line of a spiral antenna to a waveguide transition such that the spiral antenna can be fed by a waveguide directly behind a cavity interposed between the waveguide and the spiral antenna and such that the requirement for a conventional balun can be eliminated.

OBJECTS OF THE INVENTION

Accordingly, it is the primary object of the present invention to provide a mechanism for extending the usage of spiral antennas to the millimeter wave bands of frequencies from 30–150 GHz.

It is a further object of the present invention to provide a transition from a printed circuit spiral antenna to a waveguide that eliminates the requirement for a conventional balun.

It is a concomitant object of the present invention to disclose a printed circuit spiral antenna-to-waveguide transition that is small, printed, efficient and provides a good match over an octave bandwidth.

It is a further object of the present invention to disclose a transition as described above that allows the placement of several printed circuit spiral antennas in close proximity as required for various array configurations.

It is another object of the present invention to disclose a printed circuit spiral antenna-to-waveguide transition that can be matched directly to various waveguide circuits that are commonly used for electronic warfare systems.

It is a still further object of the present invention to disclose a transition as described above that permits size reduction and optimization of various receiving and transmitting circuits and permits integration of these components thereby reducing losses and improving the operating bandwidth.

Other objects, advantages and novel features of the invention will become apparent from the following detailed description of the invention when considered in conjunction with the accompanying drawings.

BRIEF DESCRIPTION OF THE DRAWINGS

FIG. 2*a* is a cross-section of the transition of the present invention viewed through the sidewall of a waveguide that is connected by the present invention to a printed circuit spiral antenna.

FIG. 2*b* is an end view of the transition illustrated in FIG. 2*a*, viewed through the right end of FIG. 2*a*.

FIG. 2 *c* is a cross-sectional top (broad wall) view of the transition illustrated in FIGS. 2*a* and 2*b*.

FIG. 3*a* is a top view of the fin-line transition card of the present invention.

FIG. 3*b* is a side view of the fin-line transition card of the present invention.

FIG. 3*c* is an end view of the fin-line transition card of the present invention.

DESCRIPTION OF THE PREFERRED EMBODIMENT

Figure 1:
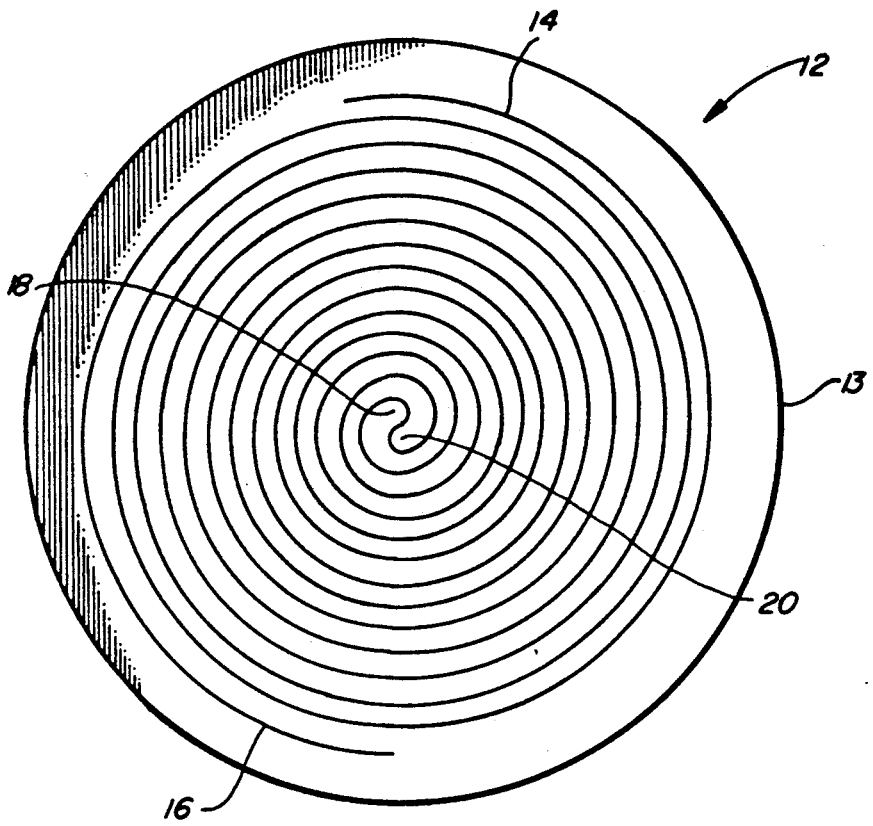
FIG. 1 is a top view of a printed circuit spiral antenna.

FIG. 1 shows an enlarged top view of a balanced, slot-line, printed circuit spiral antenna 12. The black lines represent the slots and the white lines represent conductive copper surfaces on a thin sheet of dielectric material 13. In the spiral antenna 12, the two slot-line transmission lines 14 and 16 are connected in series at point 18 and 20 at the center of the figure. The lines are open circuited at the perimeter as is illustrated. The present invention disclosed herein creates a matched broadband connection from points 18 and 20 to a standard waveguide operating in the $TE_{10}$ mode or to a waveguide circuit utilizing a fin-line or slot-line transmission.

Referring now to FIGS. 2*a*, 2*b* and 2*c*, the spiral antenna 12 is depicted as positioned within a cylindrically shaped opening within metallic, split block housing assembly 21. The spiral conductors 18 and 20 are located on the left, or inside, of the printed circuit board 13. An E-plane or fin-line printed circuit assembly 22 has a circuit pattern on circuit board 23 as is illustrated in FIGS. 3*a*, 3*b* and 3*c*. The tapered conductive patterns 24 and 25 are printed on opposite sides of the circuit board 23 as is shown. As is illustrated in FIG. 3*a*, the circuit board 23 is tapered at the right end thereof, this tapered portion being referred to as potion 23*a*. Further, tapered conductive pattern 24 on the topside of circuit board 23 is further tapered at section 24*a* to extend along the tab portion 23*a* of circuit board 23. Similarly, the conductive portion 25 on the underside of circuit board 23 is further tapered and continues along the tab portion 23*a* to the right end of fin-line structure 22 as is illustrated in FIG. 3*a*. Tapered extensions 24*a* and 25*a* are then connected, respectively, to points 18 and 20 of the spiral antenna 12 by soldering or bonding.

As is illustrated in FIG. 2*c*, the waveguide cavity 30 has gradually tapered sidewalls 35 that lead into waveguide opening 35*a*. A disc 36 of rubberized absorbing material is placed over the waveguide opening 35*a* and contains an aperture 38 through which the tab 23*a* and conductive patterns 24*a* and 25*a* extend into the cavity 32. The cavity 32 is a quarter-wavelength cavity that is formed behind the spiral antenna 12 within the metallic split block assembly 21. The rubberized absorbing material 36 is used for absorbing the back radiation. The cavity aperture 38 through which the tab 23*a* connects with the spiral antenna circuit 22 has a diameter and length designed to eliminate propagation of the waveguide $TE_{10}$ mode from the waveguide cavity 30 to the spiral cavity 32. The aperture 38 and absorber 36 thus comprise a TE mode suppressor.

Figure 4:
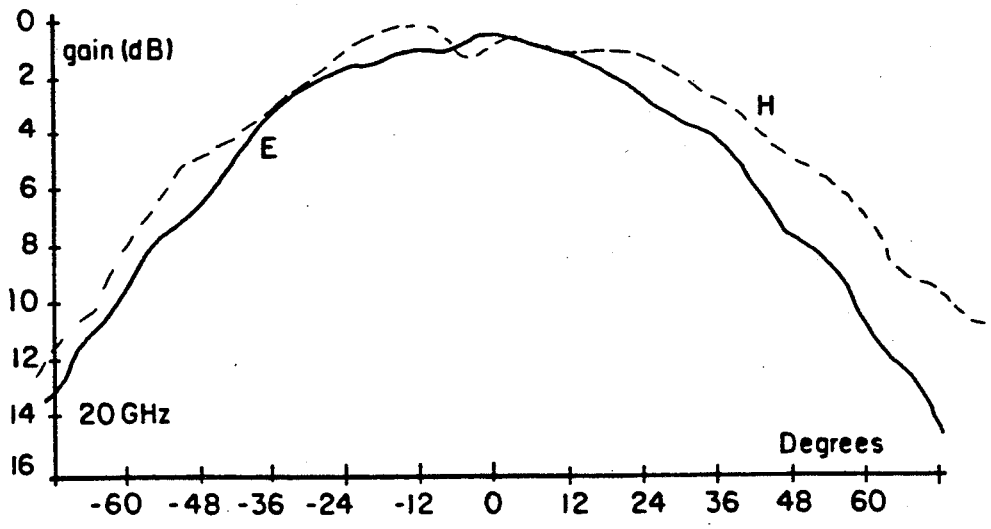
FIG. 4 is a schematic representation of a typical antenna pattern achievable with the present invention.

The circuit pattern of the fin-line structure 22 thus tapers into the waveguide cavity 30 by gradually increasing the separation between the conductive ridges 24 and 25 that are in contact with the waveguide top and bottom walls. The circuit transition 22 thus connects the terminal points 18 and 20 of the spiral antenna 12 directly to the waveguide by means of a matched broadband transmission line without the use of balun. The present invention has shown excellent results in the 18–36 GHz frequency range and can easily be scaled for use at the higher millimeter wave frequencies. FIG. 4 is a schematic representation of a typical antenna pattern achievable with the present device.

Obviously many modifications and variations of the present invention are possible in the light of the above teachings. It is therefore to be understood that within the scope of the appended claims the invention may be practiced otherwise than as specifically described.

What is claimed is:

1. A printed circuit spiral antenna-to-waveguide transition, wherein said spiral antenna includes first and second spiral conductors secured to the surface of a dielectric substrate, and wherein said waveguide includes a waveguide housing and a waveguide cavity, comprising:

a housing assembly containing a cavity, secured to said waveguide housing, said spiral antenna being mounted on said housing assembly;

a fin-line circuit card mounted within said waveguide cavity and having a printed circuit energy transition affixed thereto, said fin-line circuit card and said printed circuit energy transition extending into said housing assembly cavity, said printed circuit energy transition being electrically connected to said spiral antenna.

2. The transition of claim 1 wherein:

said spiral antenna is mounted on said housing assembly at a distance of $\lambda/4$ from said waveguide where $\lambda$ is the wavelength at the midland operating frequency of said spiral antenna.

3. The transition of claim 1 wherein said waveguide includes a waveguide aperture adjacent said spiral antenna and wherein said transition further comprises:

mode suppressor means covering a portion of said waveguide aperture for eliminating the propagation of $TE_{10}$ energy from said waveguide to said housing assembly cavity.

4. The transition of claim 3 wherein said mode suppressor means comprises a sheet of rubberized absorbing material having a round aperture therein through which a portion of said printed circuit energy transition extends.

5. The transition of claim 1 wherein said printed circuit energy transition comprises an antipodal fin-line transition.

* * * * *